June 29, 1937.  E. E. BECKMAN  2,085,568
ELECTRIC CIRCUIT
Filed Jan. 12, 1935
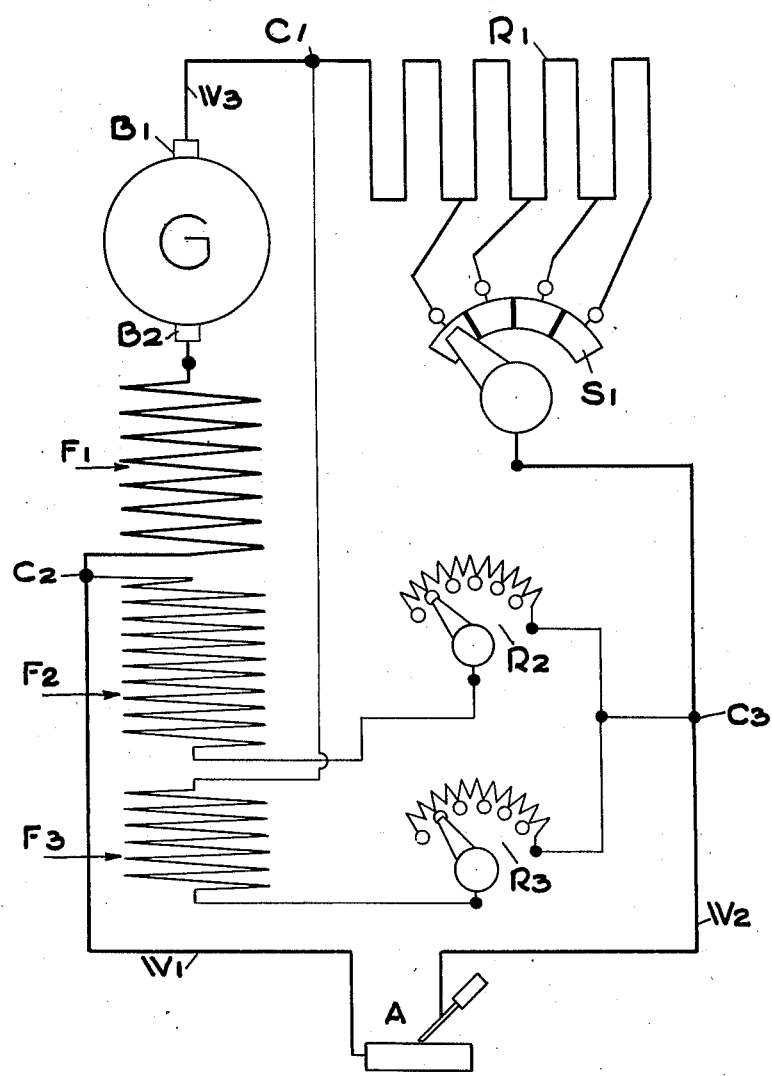
Ernest E. Beckman
Inventor
By Herbert E. Smith
Attorney Patented June 29, 1937

2,085,568

UNITED STATES PATENT OFFICE 2,085,568

ELECTRIC CIRCUIT

Ernest E. Beckman, Lind, Wash., assignor of one-half to Walter D. Krehbiel, Lind, Wash.

Application January 12, 1935, Serial No. 1,529

2 Claims. (Cl. 171—223)

My present invention relates to an improved electric circuit designed especially to furnish the current in an arc welding circuit in which the voltage from the generator is automatically controlled to provide and maintain an even and uniform flow of welding current, to stabilize the arc at the welding point, and thereby increase the efficiency of the arc in the performance of its functions.

As is well known to those skilled in the use of electric welding appliances, various transient and rapid changes occur in the voltage or value of the current of the welding circuit, caused, among other factors, by variations in the metal stream which is produced across the welding arc. In carrying out my invention I utilize these variations in the electric current and electric elements interposed in the circuit for the purpose of automatically controlling the output of the generator employed in the welding circuit, to insure the delivery of an even and uniform flow of current to the arc at all times during the process of welding.

The output of the generator can be regulated at the will of the operator of the welding equipment for a desired arc characteristic, and then this characteristic is automatically controlled or stabilized at the welding arc, the value of the welding current is maintained, and a uniform and constant deposit of metal of even grain is made, which retains the original rod characteristics. The proficiency of the welding appliance is thus enhanced, and superior results are attained, during the entire welding process, regardless of the presence at the arc of grease, or other foreign substances, which would otherwise change the arc values.

By my improved method and construction or arrangement of parts for the regulation and automatic control of the welding circuit a wide range, or flexibility of control is obtained and when the current value, which may be manually regulated or adjusted with facility, is once set, the heat values of the arc remain constant, and without necessity for further attention on the part of the operator of the welding appliance.

My invention consists essentially in certain combinations and arrangements with a current generator, or generating apparatus provided with an output circuit comprising brushes and field windings, the latter being capable of connection in series with themselves; in series parallel; and they may all be connected in parallel at will; and also in other features as will hereinafter be more fully set forth and claimed.

The single figure of the drawing is a diagram showing the various elements and controls of the welding circuit, and their relative arrangement.

In carrying out my invention I utilize any suitable electric generator G which is adapted for arc welding, and having the conventional armature, and brushes B1 and B2, and the generator is provided with the three field windings or coils F1, F2, and F3.

The field winding F1 is a conventional series field capable of carrying the entire output of the generator, without overheating, and is so designed that when connected in series, will furnish sufficient field excitation for the entire generator output.

The welding circuit which may be traced from the brush B2, flows through the series field winding F1, and includes the welding lead or conductor wire W1 to one side of the arc A; thence from the other side of the arc through the welding conductor or lead wire W2, to a sectional manually regulated or adjusted switch S1 that is employed for rough selection of current values or characteristics for the arc circuit. From the sectional switch S1 the current flows through a heavy duty low value resistor R1, here shown as having four steps, and with taps in connection with the selector switch S1, thence from the resistor R1, the current flows through wire W3 to the brush B1 and armature of the generator.

The field winding F2 is a controlling field, which is connected in the arc circuit at terminal C2 of the wire W1 and shunted as shown to the terminal C3 of the wire W2, and this control circuit includes also the rheostat R2, if desirable, which controls the open circuit voltage of the generator, and has the proper value for the field F2.

The coils of the field F2 are wound on the poles of the generator in such manner as to supply the open circuit voltage required and with the maximum inductive relation to the series coil or field F1, and any change of current through the field F1 will have its effect upon the field F2. By connecting the control circuit of the field F2 at points C2 and C3, the current supply for this shunt field excitation is not affected while on open circuit by the output of the generator, but the current in the control circuit will readily increase to the open-circuit voltage as set by use of the rheostat R2 or by the natural flux of this coil without R2. At the instant of striking the arc A, the voltage in this field circuit F2 is near zero, and the effect of the coil is therefore neutralized, thus preventing any substantial surge of current across the arcing point A. Because of the inductive effects of field F2, however, the neutralizing effect on the coil F2 is not instantaneous, and therefore a definite time lag or delay is present before the neutralizing action on the coil takes place.

At the instant of striking the arc, an increasing output of current passes through the field F1, which has the effect of further reducing the voltage or current values of the field F2, because of the inductive relation between the two fields F1 and F2. The values of the current required across the arc A depend upon the flux of the series field F1, and the combined effects of the coils F2 and F3 in their relation to the circuit, and these values are roughly selected or regulated by means of the manually operated selector switch S1.

After the arc or welding circuit has been established, a third field coil F3, which is connected with the welding circuit at C1 to the wire W3 and at C3 to the wire W2, becomes available for use in maintaining a current corresponding exactly to the increase in voltage across the resistor R1. This third field F3 which is in parallel with the resistor R1 includes in its control circuit a manually operated rheostat R3, which controls the voltage differential between the generator and the arc, and this rheostat is more precisely adjusted for arc characteristics after the selection has roughly been made by the use of the selector switch S1.

This field coil F3 is affected only by the increase in the voltage across the resistor R1 of the welding circuit, and this field performs the functions of a compensating coil, which limits the flow of current across the arc, and is active only when current is flowing in the welding circuit.

The resistor R1 is of the low value type, with gradually increasing steps, which may be selected by use of the switch S1, and its range in values should be between a minimum that is readily capable of dissipating heat of the rated output and a maximum value capable of carrying say fifty per cent more current than the required minimum. The resistor R1 may have an increase in value or voltage drop ranging from two volts to ten volts, but this may range to lower points.

In actual practice, for example, with a resistor value of .010 ohm in the lowest step of R1, a voltage of 2 volts occurs at 200 amperes and 4 volts at 400 amperes, this relationship varying according to the adjustment of S1.

The field coil F3 should be of sufficient ampere turns to neutralize approximately fifty per cent of the normal field flux with a rise of fifty per cent in voltage drop (or increased current value) across the resistor R1 with R3 set at lowest value.

When the operator makes contact with the work and the arc is struck, the voltage or current value between the two terminal points C2 and C3 reaches almost the zero point, and these points C2 and C3 will at all times show the voltage across the arc A. This voltage across the welding arc varies, due to both the manipulation of the arc and to the passage of the metal stream across the arc. Inasmuch as the field coils F2 and F3 have a definite time lag, depending on their combined inductive effect, a pulsating current is established across the arc having a definite, even, and uniform frequency, and the action of this pulsating current causes and maintains a stream of metal across the arc having a steady flow in step with the frequency of the pulsating current. The compensating field F3 allows the field flux to increase or decrease within limits and thus establishes both the maximum and minimum voltage or current values of these pulsations. During these fluctuations or variations in voltage, when the current value increases a definite amount of metal is carried across the arc, and as this current decreases the amount of metal in the stream is checked, thus maintaining an even, uniform, and constant welding stream, free from large drops of metal that would otherwise drip across the arc and which would impair the efficiency of the welding operation.

If the current across the arc remained constant, the value of the shunt field F2 would be in direct proportion to the arc voltage, but inasmuch as the current across the arc, of itself, does not remain constant but varies, therefore with a rising and falling current value, the shunt field F2 becomes, and performs the functions of a secondary winding of a transformer, with the series field F1 as the primary. With a rising current the current in the shunt field F2 is practically reversed, while with a falling current the current in the shunt field is built up in the normal direction. This action has the result of preventing heavy surges of the welding current, when the current values strike the arc, and the action also tends to restore and does restore the generator voltage, almost instantly. Due to this control by the shunt field and the discharge of the induced current across the arc instead of through the generator circuit tends to maintain the arc if it has a tendency to break at a value where the discharge voltage becomes equal to the reactance and resistance of the generator circuit, which is about equal to the open circuit voltage of the generator. This control automatically affects the generator and the welding circuit, in that it has the effect of breaking down any added arc resistance, and the controlled current provides a path for the continuation of the welding current, also increasing the shunt field flux which tends to increase generator voltage. By this automatic control of the current values at the arcing point I am enabled to dispense with the use of various devices or factors that are otherwise necessary, such as reactors or stabilizers.

Thus, if a given welding current causes a drop of, for instance, six volts across the low value resistor R1, and with the winding of the field F3 calculated to reduce the magnetic flux of the generator to a value that will deliver the desired welding current to the electrodes at the arcing point, a positive means of control is established for the generator, and by the addition of the rheostat R3 to this control circuit of field F3, any drop in voltage across the resistor R1 may be obtained within the desired range. This control permits the selection of a welding current of any desired characteristic, and allows the generator to operate at different voltages, after the selector switch S1 has been set.

Having thus fully described my invention, what I claim as new and desire to secure by Letters Patent is:

1. An electric circuit including a generator having brushes and a load circuit therefor, a series field winding in the load circuit between one of the brushes and the load, a resistor in the load circuit between the opposite brush and the load, a control field winding in shunt with the load and connected at one end between the series field winding and the load and at the other end between the resistor and the load, and a field coil connected in parallel with the resistor.

2. An electric circuit including a generator having brushes and a load circuit therefor, a series field winding in the load circuit between one of the brushes and the load, a resistor in the load circuit between the opposite brush and the load, a control field winding and rheostat therefor in shunt with the load and connected at one end between the series field winding and the load and at the other end between the resistor and the load, and a field coil and rheostat therefor connected in parallel with the resistor.

ERNEST E. BECKMAN.